United States Patent
Tserng

(10) Patent No.: US 7,346,898 B2
(45) Date of Patent: Mar. 18, 2008

(54) METHOD FOR SCHEDULING PROCESSORS AND COPROCESSORS WITH BIT-MASKING

(75) Inventor: Christopher Tserng, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 10/353,517

(22) Filed: Jan. 29, 2003

(65) Prior Publication Data

US 2003/0154332 A1 Aug. 14, 2003

Related U.S. Application Data

(60) Provisional application No. 60/352,689, filed on Jan. 29, 2002.

(51) Int. Cl.
G06F 9/45 (2006.01)
G06F 9/44 (2006.01)

(52) U.S. Cl. .................... 717/140; 717/149; 717/151

(58) Field of Classification Search ............... 717/119, 717/124, 127, 140–151, 161, 102–103, 136
See application file for complete search history.

(56) References Cited

U.S. PATENT DOCUMENTS

| | | | |
|---|---|---|---|
| 4,885,684 A * | 12/1989 | Austin et al. ............... | 717/149 |
| 5,721,854 A * | 2/1998 | Ebcioglu et al. ............. | 712/203 |
| 5,764,243 A * | 6/1998 | Baldwin ...................... | 345/506 |
| 5,802,374 A * | 9/1998 | Gupta et al. ................. | 717/149 |
| 5,978,830 A * | 11/1999 | Nakaya et al. .............. | 718/102 |
| 6,016,395 A * | 1/2000 | Mohamed .................... | 717/149 |
| 6,317,872 B1 * | 11/2001 | Gee et al. .................... | 717/152 |
| 6,397,397 B1 * | 6/2002 | Chen ............................ | 2/243.1 |
| 6,502,237 B1 * | 12/2002 | Yates et al. .................. | 717/136 |
| 6,532,016 B1 * | 3/2003 | Venkateswar et al. ...... | 345/504 |
| 6,683,979 B1 * | 1/2004 | Walker et al. ............... | 382/166 |
| 6,748,587 B1 * | 6/2004 | Santhanam et al. ......... | 717/140 |
| 6,765,571 B2 * | 7/2004 | Sowizral et al. ............ | 345/420 |
| 6,804,664 B1 * | 10/2004 | Hartman et al. ............... | 707/3 |
| 6,868,123 B2 * | 3/2005 | Bellas et al. ........... | 375/240.16 |
| 6,912,702 B1 * | 6/2005 | Iyer et al. ....................... | 716/6 |
| 6,993,753 B2 * | 1/2006 | Yamanaka et al. .......... | 717/140 |
| 7,098,801 B1 * | 8/2006 | Burness .................... | 340/815.4 |
| 7,143,401 B2 * | 11/2006 | Babaian et al. ............. | 717/149 |
| 7,191,433 B2 * | 3/2007 | Narad et al. ................. | 717/140 |
| 7,254,806 B1 * | 8/2007 | Yates, Jr. et al. ........... | 717/136 |

OTHER PUBLICATIONS

Setia et al, "Processor scheduling on muliprogramd disttributed memory parallel computers", ACM SIGMETRICS, pp. 158-170, 1993.*
Bender et al, "Scheduling click multithreaded parallel programs on processors of different speeds", ACM SPAA, pp. 13-21, 2000.*
Blank et al, "A parallel bit map processor architecture for DA algorithms", IEEE, pp. 837-845, 1981.*
Wilmore, "A hierarchical bit map format for the representation of IC mask data", ACM pp. 585-590, 1980.*
Yourst et al, "Incremental commit groups for non atomic trace processing", IEEE MICRO, pp. 1-12, 2005.*
Obrenic et al, "Using emulations to enhance the performance of parallel architecture", IEEE, Trans. on Parallel and Distributed Systems, vol. 10, No. 10 pp. 1087-1081, 1999.*

* cited by examiner

*Primary Examiner*—Anil Khatri
(74) *Attorney, Agent, or Firm*—W. James Brady, III; Frederick J. Telecky, Jr.

(57) ABSTRACT

Multiple coprocessor scheduling of parallel processing steps control with bit arithmetic using a bitmask for each data block buffer indicating next processing step and a bitmask of processing steps with available coprocessors. ANDs of the bitmasks for the buffers with the bitmask of processing steps determines processing steps to run. This allows for parallel processing on the data blocks in the various buffers.

4 Claims, 2 Drawing Sheets

METHOD FOR SCHEDULING PROCESSORS AND COPROCESSORS WITH BIT-MASKING

CROSS-REFERENCE TO RELATED APPLICATIONS

This application claims priority from provisional applications: Serial No. 60/352,689, filed Jan. 29, 2002.

BACKGROUND OF THE INVENTION

The invention relates to electronic devices, and more particularly to multiple coprocessor scheduling methods and circuitry.

Various signal processing tasks such as video, image, and speech encoding and decoding decompose large data sets into blocks or frames and apply multiple processing steps for each block or frame. This has led to distributed systems with multiple processors working on various processing steps in a pipeline processing of a sequence of data blocks, and this creates the problem of scheduling processing steps of data blocks on the appropriate processors.

SUMMARY OF THE INVENTION

The present invention provides bit-arithmetic-based scheduling for systems with multiple coprocessors.

This has advantages including simple scheduling computations for pipelined processing.

BRIEF DESCRIPTION OF THE DRAWINGS

The drawings are heuristic for clarity.

DETAILED DESCRIPTION OF THE PREFERRED EMBODIMENTS

1. Overview

Preferred embodiment scheduling methods schedule a sequence of processes on a set of hardware coprocessors/accelerators for data sets in shared memories. The methods keep all of the coprocessors busy and manage the shared memory among the coprocessors to provide concurrent execution. At the same time, they achieves very low overhead by avoiding weighty operating system calls (semaphores, task switching, etc.). Indeed, the preferred embodiments use bit masks to keep track of processes to run next and coprocessors availability; and so the scheduling relies on simple bit operations.

Preferred embodiment systems include preferred embodiment scheduling methods.

Figure 4:
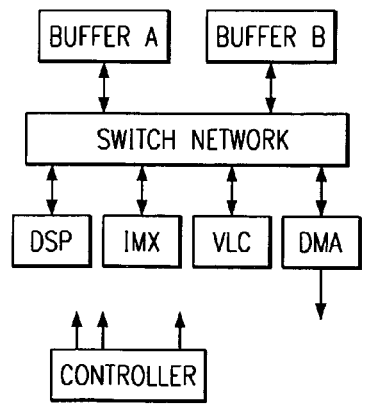
FIG. 4 is a block diagram of preferred embodiment buffers and coprocessors.

FIG. 4 shows in block form a preferred embodiment system which uses preferred embodiment scheduling methods. The methods may be implemented on a hardware sequencer or as a stored program for programmable processors and stored in an onboard or external ROM, flash EEPROM, ferroelectric RAM, or other memory or combination of memory types, or as a combination of hardware and stored program. Analog-to-digital converters and digital-to-analog converters provide coupling of a system to the real world, and modulators and demodulators (plus antennas for air interfaces) provide coupling for transmission waveforms. The encoded can be packetized and transmitted over networks such as the Internet.

2. First Preferred Embodiment Scheduler

The first preferred embodiment scheduler will be described in terms of a specific hardware set up and processing task. In particular, presume a task such as JPEG image encode with three hardware coprocessors illustrated as:

Suppose there are five different process stages that run on various ones of the hardware coprocessors in order to process a block of data; that is, data must pass from process 1 to process 5 to reach its final state. Further, take the size of the data block that each process executes as small, so in order to handle a large data set, the data set is broken into multiple blocks and each block is run through the chain of processes until all the data is processed (e.g. processing 8×8 blocks of a large image to do JPEG encoding).

Represent these five processes as follows

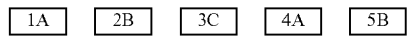

where 1A represents Process 1 that runs on coprocessor A, and so forth.

Further presume two buffers (e.g., X and Y) are to be used to pipeline the data flow (i.e. process data blocks n and n+1 simultaneously). Therefore, two fields are needed to represent which stage of the processing chain is currently ready to run for blocks n and n+1. This information is stored as a bitmask in which the position of the "1" represents the stage that the block is ready for (e.g. 10000 indicates the block is Process 1 ready, 01000 is Process 2 ready, etc). Initially, both block n and block n+1 are ready for Process 1:
BufferState[X]: 10000 (Process 1 Ready)
BufferState[Y]: 10000 (Process 1 Ready)

Additionally, a bitmask is constructed for each coprocessor. This bitmask represents which processes run on each coprocessor. A "0" in a bit position for a particular coprocessor's bitmask means that the corresponding process (represented by the bit position) runs on that coprocessor. For the foregoing the coprocessor bitmasks would be the following:
Coprocessor[A]: 01101 (Processes 1 and 4 Run on coprocessor A)
Coprocessor[B]: 10110 (Processes 2 and 5 Run on coprocessor B)
Coprocessor[C]: 11011 (Process 3 Runs on coprocessor C)

Finally, there is a coprocessor state bitmask that indicates which coprocessors are currently busy. It contains a "0" for every process (represented by the bit position) that currently cannot run due to its coprocessor being busy. Initially, all coprocessors are free so the bitmask has all 1's:
CoprocessorState:11111 (No coprocessors busy)

The following pseudocode shows the preferred embodiment scheduling of the processes on the hardware coprocessors. Initially all the processes are set to run on the block in Buffer X.
buf is X or Y indicating which buffer is being used
proc is A, B, or C indicating which coprocessor is being used

```
while (processingData)
{
    // Calculate which process' to run
    readyToRunBitmask = (BufferState [X] | BufferState [Y])
                    & CoprocessorState
    processToRun = rightMostBit (readyToRunBitmask)
    // If there is something to run
    if (processToRun)
    {
        // Clear the buffer state for the process since
        // this buffer is about to be used
        buf = getProcessBuffer (processToRun)
        BufferState[buf] = 0
        // Set the Coprocessor State to Indicate the
        // Coprocessor that this process runs on is busy
        proc = getProcessCoprocessor (processToRun)
        CoprocessorState &= Coprocessor [proc]
        // Start the process
        startProcess (processToRun)
    }
    // Check to see if any Processes are done
    if (anyProcessDone ( ) )
    {   processDone = getDoneProcess ( )
        // Set buffer state for next process in chain
        buf = getProcessBuffer (processDone)
        BufferState [buf] = nextBit (processDone)
        // Clear Coprocessor State
        proc = getProcessCoprocessor (processDone)
        CoprocessorState | = ~Coprocessor [proc]
        // Switch the buffer for the process
        // If X, switch to Y; if Y, switch to X
        switchprocessBuffer (processDone)
    }
}
```

In short, by using bit arithmetic the first if{} finds when a process which is ready to run and also has a coprocessor that is free plus updates the busy status of the buffer and coprocessor. If two processes are available, then the one that is further along in the chain is run first. Also by using bit arithmetic the second if{} updates the buffer state and coprocessor availability when a process is done. The while {} repeatedly cycles through these two if {}'s.

Of course, the complementary logic could be used: the BufferState[X] would use a "0" to indicate the next process to be run, the CoprocessorState would have a "0" for each free process, the BufferStates would be combined by AND and then NORed with the CoprocessorState to yield ready-ToRun with the right most "0" indicating the next process to run.

The generalization to other than three coprocessors, five processing steps, and two buffers is straightforward.

The following section provides an example execution.

3. Example Execution

The following is a sample execution of the foregoing set up of three processors, five processing steps, and two buffers. The processes will be augmented to show which buffer they are operating on as in the following diagram:

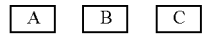 (Process 1 is Running on processor A using Buffer X)

Initially this is the state (all the processors are free):

BufferState[X]: 10000
BufferState[Y]: 10000
CoprocessorState: 11111
readyToRun=10000 processToRun=1

This means that it is time to run Process 1 which runs on Coprocessor A using Buffer X (Block n) because all processes are initially set to run from Buffer X.

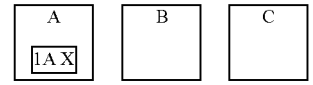

BufferState[X]: 00000
BufferState[Y]: 10000
CoprocessorState:01101
readyToRun=00000 processToRun=0

So nothing is ready to run, so the scheduler just keeps looping, until process 1AX is done.

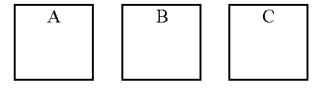

BufferState[X]: 01000
BufferState[Y]: 10000
CoprocessorState: 11111
readyToRun=11000 processToRun=2

Now Process 2 is ready to run on Coprocessor B using Buffer X (Block n)

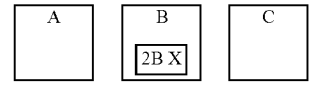

BufferState[X]: 00000
BufferState[Y]: 10000
CoprocessorState: 10110
readyToRun=10000 processToRun=1

While Process 2 is running, process 1 is also ready to run again processing block n+1 in buffer Y.

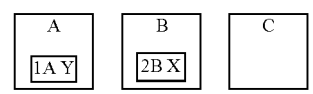

BufferState[X]: 00000
BufferState[Y]: 00000
CoprocessorState: 00100
readyToRun=00000 processToRun=0

Now there is nothing to run again so we idle until something is done. Let's assume process 2BX completes first.

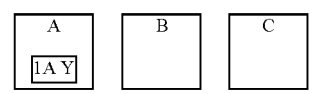

BufferState[X]: 00100
BufferState[Y]: 00000
CoprocessorState: 01101
readyToRun=00100 processToRun=3

So now process 3 is ready to run on coprocessor C using buffer X (block n)

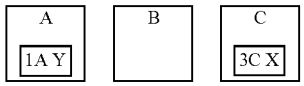

BufferState[X]: 00000
BufferState[Y]: 00000
CoprocessorState:01001
readyToRun=00000 processToRun=0

Again both buffers are occupied running on 2 processors so we idle until something is done. Let's say that 3CX completes first, however since A is still running 4AX can't be run yet.

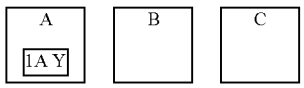

BufferState[X]: 00010
BufferState[Y]: 00000
CoprocessorState: 01101
readyToRun=00000 processToRun=0

Now let's say that 1AY completes next.

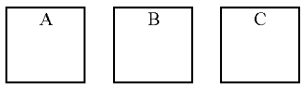

BufferState[X]: 00010
BufferState[Y]: 01000
CoprocessorState: 11111
readyToRun=01010 processToRun=4

So now both process 2BY and 4AX are ready to run, but we run the one that is further along, 4AX.

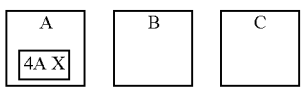

BufferState[X]: 00000
BufferState[Y]: 01000
CoprocessorState:01101
readyToRun=01000 processToRun=2

Now we can also start process 2BY.

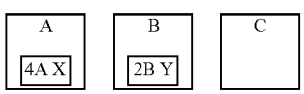

BufferState[X]: 00000
BufferState[Y]: 00000
CoprocessorState: 00100
readyToRun=00000 processToRun=0

Again we are in an idle state waiting for a process to be done.

From this sample execution one can see how the scheduler is pipelining blocks n and n+1 through the chain of processes while handling resource management in a very efficient manner seeing most of the calculations consist of bit arithmetic.

This method can be extended for any number of coprocessors, processing steps, and any number of buffers. The more buffers, the more blocks you can pipeline at a given time.

It can also be implemented in hardware on a simple sequencer.

4. Digital Camera Preferred Embodiments

Figure 1:
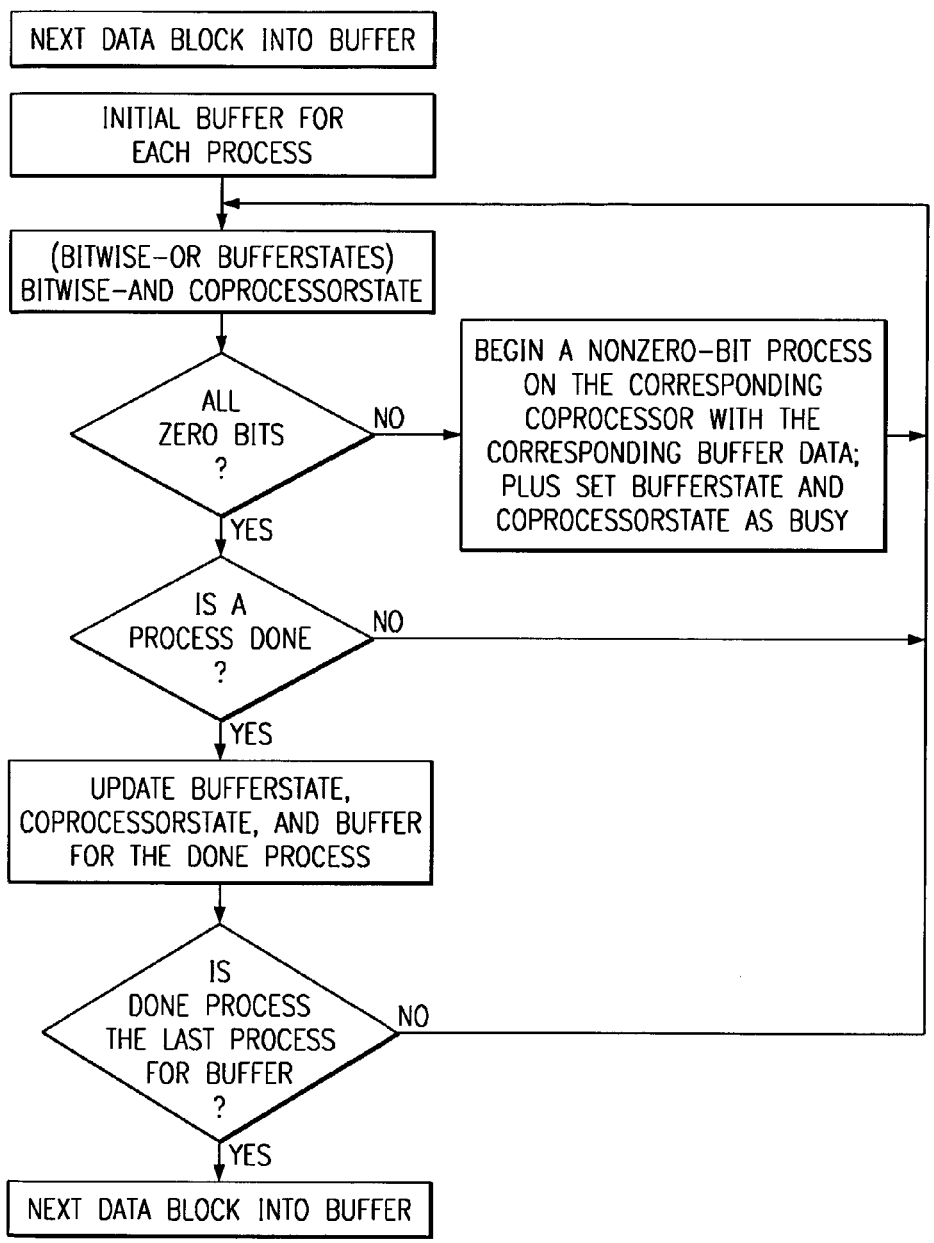
FIG. 1 is a flow diagram for a preferred embodiment.
Figure 2:
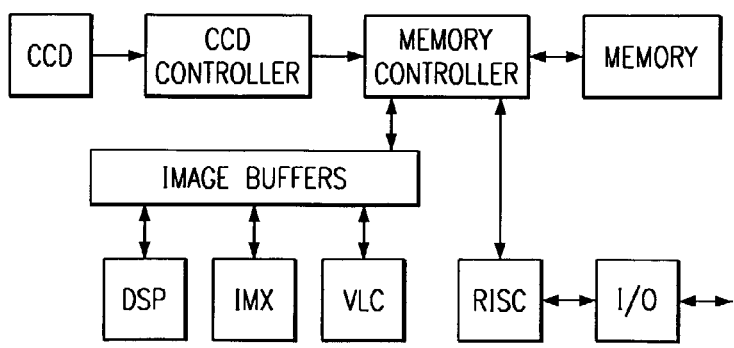
FIG. 2 shows components of a digital still camera.
Figure 3:
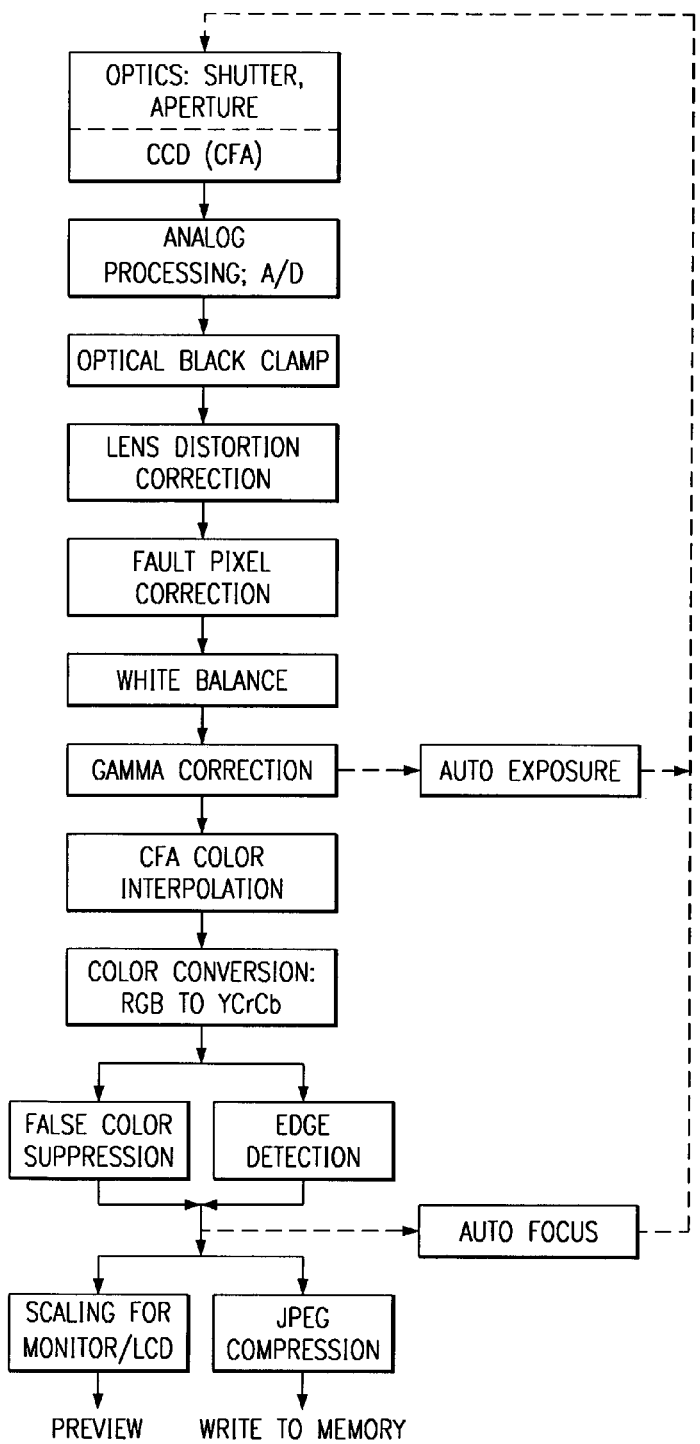
FIG. 3 illustrates functional flow in a digital still camera.

FIGS. 2-3 illustrate simple components and data flow for image capture and JPEG compression in a preferred embodiment digital camera. The RISC processor provides overall control, the DSP provides image pipeline processing control including the scheduling and control of the switch network, and the IMX plus VLC processors provide specialized processing steps. Communication among the various processors may be by use of a portion of shared memory.

Capture of an image proceeds in two stages: first the raw CCD output (e.g., an 1600×1400 pixel image in Bayer CFA pattern decomposes to 100×87.5 macroblocks) is stored in the memory, and then sequentially each macroblock in the image is read from the memory, processed by the image pipeline, and the resulting JPEG-compressed macroblock is written back into the memory. FIG. 3 shows digital functionality, and FIG. 4 illustrates two image buffers (buffer A and buffer B) which can connect to any one the various processors for pipelined processing of two macroblocks.

The macroblock processing may be as follows.

(1) DMA reads a 22×22 pixel block of CFA data from memory and writes it to buffer A. The 22×22 size has the target 16×16 macroblock in the center with the extra 3-pixel wide boundary to accommodate the filter kernels used subsequently to yield the final 16×16 macroblock.

(2)-(4) IMX performs white balance, contrast, and gamma correction on the 22×22 block; for each of the three processes the IMX reads from and then writes back to buffer A.

(5) IMX performs CFA interpolation on the 22×22 block to yield an 18×18 block of red, an 18×18 block of green, and an 18×18 block of blue; again IMX reads from and writes back to buffer A. The output blocks are smaller than the input 22×22 block due to the 5×5 kernel of the CFA interpolation filtering, but there are now three blocks and the memory occupied has increased.

(6) IMX performs color space conversion from 18×18 RGB to 18×18 YUV (YcbCr) pixel by pixel. Again, IMX reads from and writes to buffer A.

(7)-(8) IMX performs edge enhancement on 18×18 Y and color suppression plus color saturation on 18×18 U and 18×18 V to yield new 16×16 Y, 16×16 U, and 16×16 V.

(9) IMX subsamples the 16×16 U and 16×16 V to 8×8 U and 8×8 V, plus partitions 16×16 Y into four 8×8 Y's; the net is six 8×8 blocks: YYYYUV. This is 4:2:0 format. Again the IMX reads from and writes to buffer A.

(10) IMX performs 8×8 DCT on each of the six 8×8 blocks; again read from and write to buffer A.

(11) VLC quantizes the DCT coefficients and Huffman encodes the quantized coefficients to output a variable length code for the six 8×8 DCT blocks. Again read from and write back into buffer A.

(12) DMA reads the Huffman code from buffer A and writes it to the memory.

The IMX CFA interpolation consumes the greatest time of the foregoing processes with the read from memory, white balance, edge enhancement, and DCT also long processes.

With a second buffer B, the DMA and VLC could be operating on buffer B while IMX is operating on buffer A, and conversely. The timing for the start of each process could be as follows with blocks n, n+2 in buffer A and blocks n−1, n+1 in buffer B and with the simplifying assumption that process (11) takes less time than processes (2)-(4), process (12) takes less time than process (5), and process (1) takes less time than processes (6)-(10):

| Time | buffer A | buffer B |
|------|----------|----------|
| t2 | (2) IMX [n] | (11) VLC [n − 1] |
| t3 | (3) IMX | |
| t4 | (4) IMX | |
| t5 | (5) IMX | (12) DMA |
| t6 | (6) IMX | (1) DMA [n + 1] |
| t7 | (7) IMX | |
| t8 | (8) IMX | |
| t9 | (9) IMX | |
| t10 | (10) IMX | |
| t11 | (11) VLC | (2) IMX |
| t12 | | (3) IMX |
| t13 | | (4) IMX |
| t14 | (12) DMA | (5) IMX |
| t15 | (1) DMA [n + 2] | (6) IMX |
| t16 | | (7) IMX |
| t17 | | (8) IMX |
| t18 | | (9) IMX |
| t19 | | (10) IMX |
| t20 | (2) IMX | (11) VLC |
| t21 | (3) IMX | |

5. Alternative Preferred Embodiments

The preferred embodiment methods can be generalized to provide locking on more than one feature. The foregoing methods provide locking by the Coprocessor[] bitmasks indicating which processes run on the coprocessor. In the more general case of some coprocessors sharing memory the preferred embodiments have Memory bitmasks set to handle the mutual exclusion arising from the sharing of the memory. In this case the readyToRunBitmask would & the CoprocessorState and the MemoryState bitmasks to get an available process to run.

Further, for the case of more than two buffers define a vector with jth component equal to the identity of the buffer which will next run process j. Then the switchProcessBuffer function would cycle through the buffers for each component rather than just toggling as in the section 2 code.

What is claimed is:

1. A method of scheduling processes among coprocessors, comprising:
   (a) providing a first bitmask indicating a process step for a first data block, and a second bitmask indicating a process step for a second data block;
   (b) providing a third bitmask indicating coprocessor availability; and
   (c) bitwise combining said first, second, and third bitmasks to determine coprocessor utilization to execute multiple data blocks concurrently.

2. The method of claim 1, wherein:
   (a) said bitwise combining of step (c) of claim 1 is bitwise OR and/or AND.

3. A multiple coprocessor system, comprising:
   (a) a plurality of coprocessors in communication;
   (b) a plurality of memories coupled to said coprocessors; and
   (c) a scheduler coupled to said coprocessors and memories, said scheduler including (i) a plurality of memory bitmasks, each of said memory bitmasks indicating a process step for contents of one of said memories, (ii) a coprocessor bitmask indicating availability of said coprocessors, and (iii) a controller for bitwise combining said bitmasks to determine coprocessor utilization.

4. The system of claim 3, wherein:
   (a) said coprocessor bitmask has an entry for each process step of a plurality of process steps and said entry indicates whether at least one coprocessor capable of performing the corresponding process step is available.

* * * * *